United States Patent [19]

Kerr

[11] 3,713,520
[45] Jan. 30, 1973

[54] VISCOUS FLUID CLUTCH
[75] Inventor: Lamar L. Kerr, Englewood, Ohio
[73] Assignee: General Motors Corporation, Detroit, Mich.
[22] Filed: April 29, 1971
[21] Appl. No.: 138,490

[52] U.S. Cl.................................192/58 B, 192/82 T
[51] Int. Cl..............................................F16d 35/00
[58] Field of Search........................192/58 B, 82 T

[56] References Cited

UNITED STATES PATENTS

| | | | |
|---|---|---|---|
| 3,217,849 | 11/1965 | Weir | 192/58 B X |
| 3,191,733 | 6/1965 | Weir | 192/58 B |
| 3,155,209 | 11/1964 | Weir | 192/82 T X |
| 3,262,528 | 7/1966 | Weir | 192/58 B |
| 3,339,689 | 9/1967 | Sutaruk | 192/58 B |

*Primary Examiner*—Allan D. Herrmann
*Attorney*—Warren E. Finken, A. M. Heiter and John P. Moran

[57] ABSTRACT

A viscous fluid clutch including relatively rotatable first and second drive members having a fluid shear space therebetween and which are cooperable with a fluid medium in the shear space to provide a shear-type fluid drive therebetween, an annular reservoir for at times storing the fluid medium, an internally-mounted preloaded temperature-responsive bimetallic valve member for regulating the flow of the fluid medium from the annular reservoir to the fluid shear space, the bimetallic valve member being mounted at one end thereof on the divider wall in the reservoir and extending across the center of the clutch unit to control an opening between the reservoir and the operating chamber, the cover member being formed such that the fluid storage space in the reservoir assures that a substantial central portion of the bimetallic element will remain uncovered by fluid and thus be continuously exposed to ambient air.

4 Claims, 7 Drawing Figures

PATENTED JAN 30 1973
3,713,520
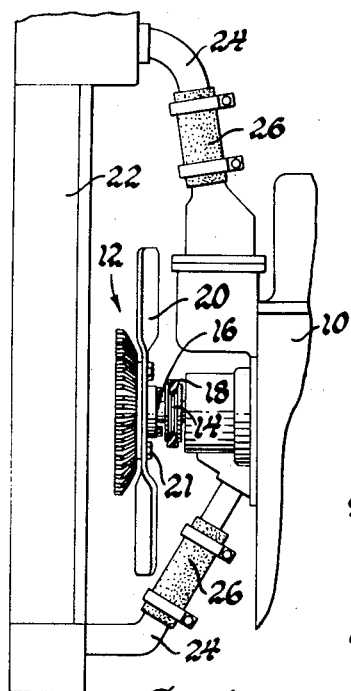
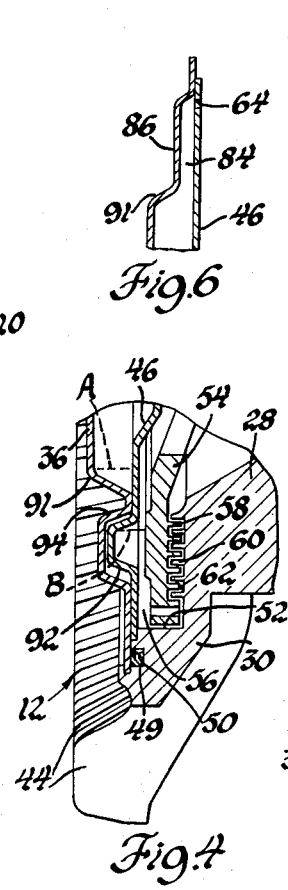
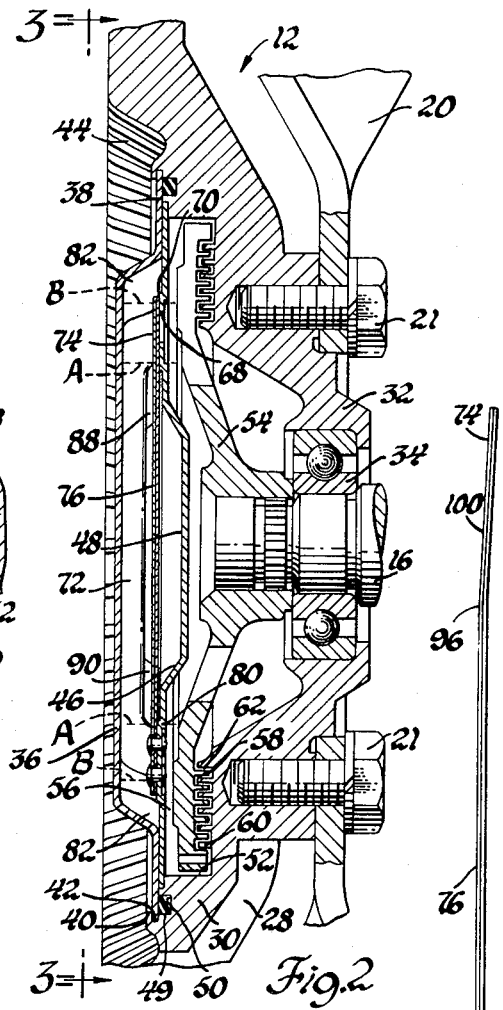
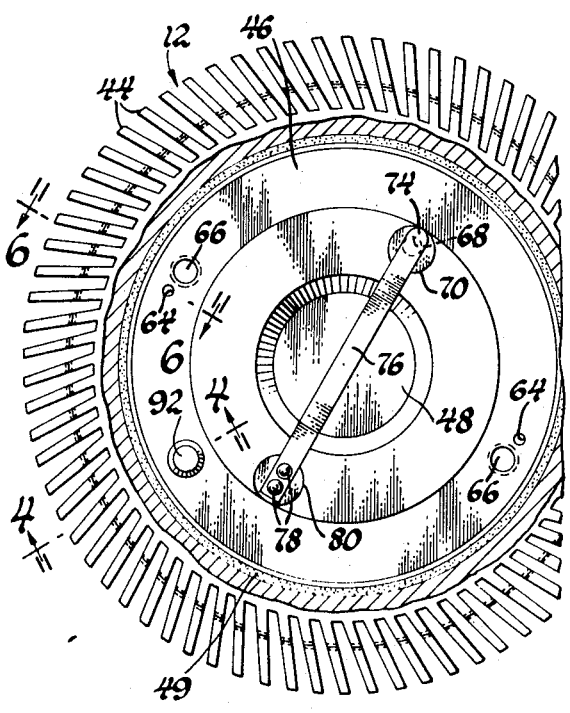
INVENTOR.
Lamar L. Kerr
BY
John P. Moran
ATTORNEY

VISCOUS FLUID CLUTCH

This invention relates generally to fluid drive devices, and more particularly to a fluid drive adapted to drive an accessory device, such as a cooling fan for an internal combustion engine.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and, as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

A primary object of the invention is to provide improved internal means for controlling the flow of fluid from the reservoir to the operating chamber in response to ambient air temperature.

Another object of the invention is to provide in a viscous fluid clutch unit an improved internal bimetallic thermostatic valve member wherein a substantial portion of the bimetallic member is continually exposed to ambient air.

A further object of the invention is to provide a viscous fluid clutch unit having a housing including a rear wall, a cover member or front wall, an intermediate divider wall, there being contained between the rear and divider walls an operating chamber for a clutch plate in viscous shear drive relationship with the housing, an annular reservoir being contained between the divider and front walls, and a bimetallic thermostatic valve member mounted at one one end in the divider wall in the reservoir and extending across the center of the clutch unit to control an opening between the reservoir and the operating chamber, the cover member being formed such that the fluid storage space in the reservoir assures a substantial central portion of the bimetallic element being uncovered by fluid and thus continuously exposed to ambient air.

These and other objects and advantages will become apparent when reference is made to the following description and accompanying drawings, wherein:

FIG. 1 is a fragmentary side elevational view of a radiator and engine having a viscous fluid clutch-driven cooling fan associated therewith;

FIG. 2 is an enlarged fragmentary cross-sectional view of a viscous fluid clutch embodying the invention;

FIG. 3 is a view taken on the plane of line 3—3 of FIG. 2, with a cover portion removed, and looking in the direction of the arrows;

FIG. 4 is a fragmentary cross-sectional view taken on the plane of line 4—4 of FIG. 3, and looking in the direction of the arrows;

FIG. 5 is a perspective view of the cover portion of the FIG. 2 structure;

FIG. 6 is a fragmentary cross-sectional view taken along the plane of line 6—6 of FIG. 3, and looking in the direction of the arrows; and FIG. 7 is an enlarged end view of a portion of the FIG. 2 structure in its unmounted state.

Referring to the drawings in greater detail, FIG. 1 illustrates an engine 10 having a viscous fluid clutch 12 and a pulley 14 mounted on a drive shaft 16 extending therefrom, the pulley 14 being rotated by a V-belt 18 connected to the crankshaft (not shown) for driving a cooling fan 20 secured to the clutch 12 by bolts 21. The fluid clutch 12 and the cooling fan 20 are located between the engine 10 and a radiator 22. The usual conduits 24 and associated hoses 26 communicate between the radiator 22 and the engine 10 adjacent the drive shaft 16.

Referring now to FIG. 2, the fluid clutch 12 includes a housing 28 which includes a rear wall 30 having a hub 32 which is rotatably mounted by a suitable bearing 34 on the drive shaft 16. The housing 28 further includes a cover member or front wall 36 which has an annular flat surface 38 formed adjacent its peripheral edge, the latter being confined by an annular lip 40 in an annular recess 42 formed in the housing 28. Cooling fins 44 are formed on the radially outer surface of the rear wall 30, and a divider wall 46 is confined between the annular flat surface 38 of the cover member 36 and the bottom face of a second annular recess 47 which is formed radially inward of the outer periphery of the recess 42.

A central annular recessed portion 48 of the divider wall 46 is formed so as to extend to the right in FIG. 2, thereby providing as large an ambient air chamber as possible between the divider wall 46 and the cover member 36, for a purpose to be described. A seal 49 is compressed by the cover member 36 in an annular groove 50 formed in the rear wall member 30 intermediate the outer edges of the annular recesses 42 and 47. A third annular deeper recess 52 is formed in the rear wall member 30 radially inwardly of the second recess 47. A clutch plate 54 is secured at its center by any suitable means to the drive shaft 16, the outer peripheral portion thereof being freely located in the operating or working chamber 56 formed by the third annular recess 52 between the rear wall member 30 and the divider wall 46.

Adjacent portions of the clutch plate 54 and the rear wall 30 are provided with torque-transmitting elements consisting of cooperating annular ridge and groove elements 58 and 60, respectively, with an intervening fluid-shear space 62 therebetween to accommodate a viscous fluid as a torque-transmitting medium.

It may be noted in FIG. 3 that a pair of pump outlet openings 64 are formed through the divider wall 46 adjacent respective pump or dam elements 66 formed on the divider wall 46 and protruding into the operating chamber 56. The pump elements 66 may each consist of a circular boss formed on the divider wall 46 by any suitable means, such as stamping, or may be a rectangular-shaped or other-shaped member secured to the divider wall 46 in any suitable manner, such as by welding.

Another opening or inlet port 68 (FIG. 2) is formed through a boss 70 (FIGS. 2 and 3) formed in the divider wall 46, at times communicating between an annular reservoir 72 between the divider wall 46 and the cover member 36 and the operating chamber 56 radially inwardly of the pump elements 66 and the pump outlet openings 64. The opening or inlet 68 is at times closed off by a valve member 74. The valve member 74 is formed adjacent one end of a bimetallic thermostatic strip element 76 which extends across the center of the divider wall 46 and is secured at its other end by rivets 78 to a second boss 80 formed on the divider wall 46 directly opposite the first boss 70. As illustrated in FIG. 3, the bimetallic thermostatic strip element 76 is located substantially perpendicular to a line connecting the two oppositely disposed pump elements 66.

It may be noted in FIGS. 2, 4, 5, and 6, that the cover member 36 is formed to include an irregularly contoured inner surface. As best seen in FIGS. 5 and 6, first and second pairs of oppositely disposed pockets 82 and 84, respectively, are formed substantially perpendicular to one another in the cover member 36. The first pair of pockets 82 extends to the full depth of the cover member 36, while the second pair of oppositely disposed pockets 84 includes a face portion 86 formed on the cover member 36 which is preferably formed at a shallow depth of approximately one-half the full depth of the cover member 36. The full-depth pockets 82 are located adjacent the valve 74 and the rivet 78 ends of the bimetallic element 76, as illustrated in FIG. 2.

As indicated in FIG. 5, the shallow-depth pockets 84 each have sides 88 and 90 which taper so as to become progressively wider as they extend radially inwardly, straddling the respective pump outlet openings 64. Thus, the oppositely disposed pockets 84, being shallow, provide an exterior cooling surface for the fluid as it exits from the openings 64 and, being tapered, direct the entering fluid into the main reservoir 72.

It should be further noted in FIGS. 4 and 5 that the cover member 36 is formed such that the deepest portion of the reservoir 72, represented by an annular bend 91, begins adjacent the radially outermost edge of the inlet opening 68 and extends radially inwardly therefrom, thus assuring that the annular level of the fluid in the reservoir 72 will be at as large a diameter as possible, thereby exposing a maximum length of the bimetallic strip 76 to ambient air.

As shown in FIG. 3, a third boss 92 is formed on the divider wall 46 in a predetermined location intermediate the boss 80 and one of the pump elements 66. The precise location of the boss 92 is only critical to the extent that it must align with a slightly larger boss 94 (FIG. 4) formed in the cover member 36 in an area which is located intermediate one of each of the pairs of pockets 82 and 84. The concentric relationship between the bosses 92 and 94 serves to properly locate the divider wall 46 and the cover member 36 with respect to each other.

The free-state shape of the bimetallic element 76 is illustrated in FIG. 7. It may be noted therein that the strip 76 has formed thereon a pair of bends 96 and 98, beyond which lie end portions 100 and 102. A pair of openings 104 and 106 are formed in the end portion 102 in order to accommodate the rivets 78 (FIG. 3). The end portion 100 includes as an integral part thereof the valve member 74 (FIG. 3). Thus it may be noted that once the bimetallic element 76 is secured to the divider wall 46, illustrated in FIG. 3, the end portions 100 and 102 will have been flattened out adjacent the bosses 70 and 80, respectively, thereby pretensioning the valve member 74 so as to preclude any movement thereof until the attainment of a particular predetermined temperature, after which the bimetallic element 76 will begin lifting the valve member 74 outwardly away from the boss 70 and the associated pump outlet opening 68. Due to the relatively long length of the bimetallic strip 76, any localized stresses resulting from the riveting operation are less significant than would be the case with a short bimetallic element.

OPERATION

So long as the vehicle engine 10 is in operation, the drive shaft 16 and the associated clutch plate 54 will be driven by the pulley 14 operatively connected via the belt 18 to the crankshaft (not shown) at an appropriate speed ratio with respect to engine speed. The initial position of the temperature-responsive valve member 74 will be closed across the opening 68 in the divider wall 46 by virtue of the above-described preformed shape of the bimetallic strip element 76, and will remain closed so long as the engine is cold, thus preventing any flow of fluid from the annular reservoir 72 into the operating chamber 56. Since the pump outlet openings 64 are always open, providing continuous communication between the operating chamber 56 and the pockets 84, fluid will be pumped therethrough by virtue of the pump elements 66 serving as dams, forcing the fluid to flow through the outlet openings 64 into the shallow pockets 84 and, thence, into the annular reservoir 72 and the pockets 82. The total volume of fluid is such that when the operating or working chamber 56 is substantially empty, the fluid in the annular reservoir 72 will be held under the action of centrifugal force in the outer annular portion of the reservoir at an inner annular liquid level "A" (FIG. 2). The head resulting from the fluid height "A" is offset by the force generated by the pumping action of the pump elements 66 on the fluid remaining in the working chamber 56, to prevent any flow-back through the openings 64. Under this condition, commonly known as the "disengaged mode," the slip between the clutch plate 54 and the housing 28 is greatest.

As the ambient temperature increases due to the warm-up of the radiator and engine, the bimetallic thermostatic valve control element 76 will begin to lift the valve 74 portion thereof off the boss 70, away from the opening 68. The predetermined preferred temperature at which the preloaded valve member 74 will begin to lift off the boss 70 is determined by the preformed shape of the valve member 74. As a result, fluid will flow through the opening 68 back into the operating chamber 56 in a progressively increasing volume with increasing temperature, as the valve element 74 lifts farther away from the opening 68. Since the outlet flow through the openings 64 remains about constant, the operating chamber 56 gradually fills until the inner annular surfaces in both the operating chamber 56 and the reservoir 72 are at the same annular liquid level "B." The volume of fluid between the annular levels "A" and "B" in the reservoir 72 is sufficient to substantially fill the shear space 62 in the working chamber 56.

As the fluid is admitted to the operating chamber 56, filling the shear space 62 between the annular opposed spaced ridge and groove elements 58 and 60, the shear-type fluid drive therebetween will be influenced and slip-speed, or the difference in speed between that of the clutch plate 54 and the housing 28, will decrease. The rotating pump or dam elements 66 will continue to promote the circulation of fluid from the operating chamber 56 through the pump outlet openings 64 to the shallow pockets 84 and, thence, to the annular reservoir 72 and the other pockets 82, from whence it will return to the operating chamber 56 upon the opening of the inlet 68.

When the cooling requirements are at a maximum, the temperature-responsive valve member 74 will have lifted completely away from the opening 68, permitting the fluid in the chambers 56 and 72 to reach a point of equilibrium, represented by the annular level "B," causing the relatively rotatable drive members 54 and 30 to operate at minimum slip-speed and thereby effecting a maximum cooling function, the fan 20 being secured to the hub portion 32 of the rear wall 30 of the housing 28 (FIG. 2) by the bolts 21.

It may be noted that, by virtue of the bimetallic element 76 being mounted at one end thereof on one side of the divider wall 46 and extending across the center of the clutch 12 to control the opening 68 adjacent the other end thereof, and by virtue of the cover member 36 being shaped to assure that there be a maximum depth of fluid between the inlet opening 68 and the adjacent annular bend 91, with the maximum depth continuing radially inwardly thereof, as previously explained, a substantial central portion of the bimetallic element 76 will remain uncovered by the resultant maximum diameter of the annular liquid level of a full volume of fluid in the reservoir 72 under the action of centrifugal force. Thus the bulk of the bimetallic strip 76 will be continuously exposed to ambient air on both sides thereof due to the respective shapes of the cover member 36 and the contoured portion 48 of the divider wall 46. Such ambient air is similar in temperature to the ambient temperature outside of the housing 28 and the cover member 36 to which a conventional external coiled bimetallic element would be responsive. The formation of the cover member 36 so as to include the shallow inlet pockets 84 helps to assure that the entering fluid will be cooled as much as possible as it is guided by the tapered walls 88 and 90 to the main reservoir 76.

Thus it should be apparent that the invention provides an economical and efficient viscous fluid clutch arrangement, including a completely internally-mounted valve means, with provisions for a maximum portion of the bimetallic member being exposed to ambient air and thus not unduly influenced by the temperature of the fluid which remains adjacent the end of the bimetallic valve under the action of centrifugal force. Also, the invention includes a provision for cooling the fluid as it enters the reservoir chamber.

It should be further apparent that the bimetallic thermostatic valve element 76 is formed so as to assure that the fluid will remain in the reservoir 72 until a predetermined temperature is reached, at which time the valve member 74 will begin to lift away from the inlet opening 68 communicating between the reservoir 72 and the operating chamber 56 to once again effectuate a fluid-shear drive relationship between the clutch plate 54 and the housing 28.

While but one embodiment of the invention has been shown and described, other modifications thereof are possible.

I claim:

1. A viscous fluid clutch comprising an input shaft, a clutch plate secured to said shaft, a fluid clutch housing rotatably mounted on said input shaft, a cover member sealed to said housing, a divider wall secured for rotation with said cover member and said housing and mounted between said cover member and said clutch plate so as to form a reservoir chamber with said cover member and an operating chamber with said housing, a first opening formed in said divider wall between said operating chamber and said reservoir chamber, pump means operatively connected to said divider wall for pumping a fluid medium from said operating chamber through said first opening to said reservoir chamber, a second opening formed in said divider wall for at times communicating said fluid medium from said reservoir chamber to said operating chamber, and bimetallic thermostatic valve means for controlling the flow of said fluid medium through said second opening in response to the temperature of the ambient air, said bimetallic thermostatic valve means including a bimetallic strip element secured at one end thereof to said divider wall in said reservoir chamber and extending across the center of said viscous fluid clutch free of any contact intermediate the ends thereof and having a valve portion formed on the other end thereof adjacent said second opening, said bimetallic strip element being preformed so as to remain closed against said second opening until a predetermined ambient temperature is reached in said reservoir chamber in the space radially within the annular surface of said fluid medium therein.

2. A viscous fluid clutch comprising an input shaft, a first member secured to said shaft a second member rotatably mounted on said input shaft, a cover member fixed to said second member such that said first member is relatively rotatable between said second member and said cover member, a divider wall secured for rotation with said cover member and said second member and mounted between said cover member and said first member so as to form an annular reservoir chamber with said cover member and an operating chamber with said second member, a pair of oppositely disposed outlet openings formed in said divider wall communicating between said operating chamber and said annular reservoir chamber, oppositely disposed pump means operatively connected to said first and second members circumferentially adjacent each of said oppositely disposed outlet openings for forcing a fluid medium from said operating chamber through said oppositely disposed outlet openings to said annular reservoir chamber, an inlet opening formed in said divider wall for at times permitting said fluid medium to flow from said annular reservoir chamber to said operating chamber, a bimetallic stem member having bent ends formed thereon and being mounted in said annular reservoir chamber with one of said bent ends being secured flatly against said divider wall and having valve means formed on the other bent end thereof adjacent said inlet opening, said stem member extending across said annular reservoir chamber substantially perpendicular to a line between said oppositely disposed pump means and being free of any contact intermediate said bent ends, said bent ends serving to maintain said valve means against said divider wall to close off said inlet opening until a predetermined ambient temperature is reached.

3. A viscous fluid clutch comprising first and second relatively rotatable drive members, said first drive member including front and rear walls and defining a fluid cavity therebetween, said front wall having first and second pairs of oppositely disposed radial pockets formed therein at substantially right angles to each other, a divider wall sealed between said front and rear walls in said fluid cavity and dividing said fluid cavity into first and second chambers, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, first and second openings formed in said divider wall for providing communication between said first and second chambers, said first and second openings being located adjacent said first pair of oppositely disposed pockets, a dam element formed on said divider wall in said first chamber adjacent each of said first and second openings for causing said fluid medium to flow through said first and second openings from said first chamber to said second chamber for varying the volume of fluid medium in said shear space to vary the torque transmitted between said first and second drive members, a third opening formed in said divider wall for at times communicating said fluid medium from said second chamber to said first chamber, a temperature-responsive valve operatively connected with said third opening for controlling the flow of said fluid medium through said third opening from said second chamber to said shear space in said first chamber to further vary the torque transmitted between said first and second drive members, said temperature-responsive valve having a stem portion extending from a location adjacent said third opening across said second chamber on a line transverse to a line between said first and second openings and secured at the end thereof to said divider wall, said valve end and said secured end being located in said second pair of oppositely disposed pockets.

4. A viscous fluid clutch comprising first and second relatively rotatable drive members, said first drive member including front and rear walls and defining a fluid cavity therebetween, said front wall having first and second pairs of oppositely disposed radial pockets formed therein at right angles to each other, said first pair of pockets being shallower than said second pair of pockets, a divider wall sealed between said front and rear walls in said fluid cavity and dividing said fluid cavity into first and second chambers, a pair of oppositely disposed bosses formed on said divider wall in said first pair of oppositely disposed pockets, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, first and second openings formed in said divider wall for providing communication between said first and second chambers, said first and second openings being located adjacent said second pair of oppositely disposed shallow pockets, said shallow pockets serving to cool the entering fluid medium, a dam element formed on said divider all in said first chamber adjacent each of said first and second openings for causing said fluid medium to flow through said first and second openings from said first chamber to said second pair of oppositely disposed pockets in said second chamber for varying the volume of fluid medium in said shear space to vary the torque transmitted between said first and second drive members, a third opening formed in said divider wall through one of said pair of oppositely disposed bosses for at times communicating said fluid medium from said second chamber to said first chamber, a valve located adjacent said one of said pair of oppositely disposed bosses for controlling the flow of said fluid medium through said third opening from said second chamber to said shear space in said first chamber to further vary the torque transmitted between said first and second drive members, said valve having a bimetallic temperature-responsive stem portion extending therefrom across said second chamber on a line transverse to a line between said first and second openings and secured at the end thereof to the other of said pair of oppositely disposed bosses, said valve end and said secured end being resiliently formed on said stem portion so as to cause said valve to be urged against said one of said pair of oppositely disposed bosses for closing off said third opening until said bimetallic stem portion responds to a predetermined ambient temperature in said second chamber.

* * * * *